(12) United States Patent
Sekiguchi

(10) Patent No.: US 7,783,683 B2
(45) Date of Patent: Aug. 24, 2010

(54) COMPUTER-READABLE STORAGE MEDIUM STORING GENERATIONAL GARBAGE COLLECTION PROGRAM

(75) Inventor: Katsutomo Sekiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 798 days.

(21) Appl. No.: 11/268,228

(22) Filed: Nov. 7, 2005

(65) Prior Publication Data

US 2007/0016634 A1 Jan. 18, 2007

(30) Foreign Application Priority Data

Jul. 13, 2005 (JP) ............................. 2005-204949

(51) Int. Cl.
*G06F 12/00* (2006.01)
(52) U.S. Cl. ...................................................... 707/819
(58) Field of Classification Search .................... None
See application file for complete search history.

(56) References Cited

U.S. PATENT DOCUMENTS

| | | | | |
|---|---|---|---|---|
| 6,286,016 B1 * | 9/2001 | Heller et al. | ................. | 707/206 |
| 6,470,361 B1 * | 10/2002 | Alpern et al. | ................ | 707/206 |
| 6,760,815 B1 * | 7/2004 | Traversat et al. | ............. | 711/135 |
| 6,763,440 B1 * | 7/2004 | Traversat et al. | ............. | 711/159 |
| 6,826,583 B1 * | 11/2004 | Flood et al. | .................. | 707/206 |
| 6,854,115 B1 * | 2/2005 | Traversat et al. | ............... | 718/1 |
| 6,865,657 B1 * | 3/2005 | Traversat et al. | ............. | 711/170 |
| 6,874,066 B2 * | 3/2005 | Traversat et al. | ............. | 711/135 |
| 6,934,755 B1 * | 8/2005 | Saulpaugh et al. | .......... | 709/226 |
| 6,941,410 B1 * | 9/2005 | Traversat et al. | ................ | 711/6 |
| 6,957,237 B1 * | 10/2005 | Traversat et al. | ............. | 707/206 |
| 7,107,426 B2 * | 9/2006 | Kolodner et al. | ............. | 711/170 |
| 7,114,045 B1 * | 9/2006 | Pliss et al. | ................... | 711/159 |
| 7,302,544 B2 * | 11/2007 | Chung et al. | ................. | 711/173 |
| 2002/0055929 A1 * | 5/2002 | Kolodner et al. | ........ | 707/103 R |
| 2002/0055941 A1 * | 5/2002 | Kolodner et al. | ............. | 707/200 |
| 2002/0194421 A1 * | 12/2002 | Berry et al. | ................ | 711/100 |
| 2004/0111448 A1 * | 6/2004 | Garthwaite | .................. | 707/206 |

(Continued)

FOREIGN PATENT DOCUMENTS

| | | |
|---|---|---|
| JP | 02-156365 | 6/1990 |
| JP | 2001-184219 | 7/2001 |
| WO | WO 2004/099985 A1 * | 11/2004 |

OTHER PUBLICATIONS

Yoshida, Y. and M. Sato "Memory Control System", machine translation of Japanese Patent Publication 06-309220, Nov. 4, 1994.*

(Continued)

*Primary Examiner*—Luke S Wassum
(74) *Attorney, Agent, or Firm*—Greer, Burns & Crain, Ltd.

(57) ABSTRACT

In a computer-readable storage medium storing a generational garbage collection program used to direct a computer to perform a generational garbage collection process, the generational garbage collection process includes a generational garbage collection environment preparing and initializing process, and the generational garbage collection environment preparing and initializing process includes a process of allocating a single virtual memory space as a virtual memory space of all generations, and distributing the single virtual memory space to each generation such that the virtual memory space of each generation can be continuously arranged in order of generation in the single virtual memory space.

10 Claims, 17 Drawing Sheets

U.S. PATENT DOCUMENTS

2004/0133759 A1* 7/2004 Sekiguchi ................... 711/170
2004/0168030 A1* 8/2004 Traversat et al. ............ 711/133
2004/0221194 A1* 11/2004 Denninghoff et al. ......... 714/11
2005/0166028 A1* 7/2005 Chung et al. ................ 711/170
2005/0240641 A1* 10/2005 Kimura et al. .............. 707/206

OTHER PUBLICATIONS

Nilsen, K.D. and H. Gao "The Real-Time Behavior of Dynamic Memory Management in C++", Proceedings of the Real-Time Technology and Applications Symposium, a995, pp. 142-153.*

Kawaba, M. "Memory Management Device and Storage Medium with Memory Management Program Stored Therein", machine translation of Japanese Patent Publication 11-312117, Nov. 9, 1999.*

Miyashita, T., H. Yasuga, K. Matsuda and T. Kagawa "Garbage Collection Performing Method, Computer Program, Program Storage Medium and Information Processor", machine translation of Japanese Patent Publication 2002-278828, Sep. 27, 2002.*

Barrett, D.A. and B.G. Zorn "Garbage Collection Using a Dynamic Threatening Boundary", Proceedings of the ACM SIGPLAN Conference on Programming Language Design and Implementation (PLDI '95), Jun. 18-21, 1995.*

* cited by examiner

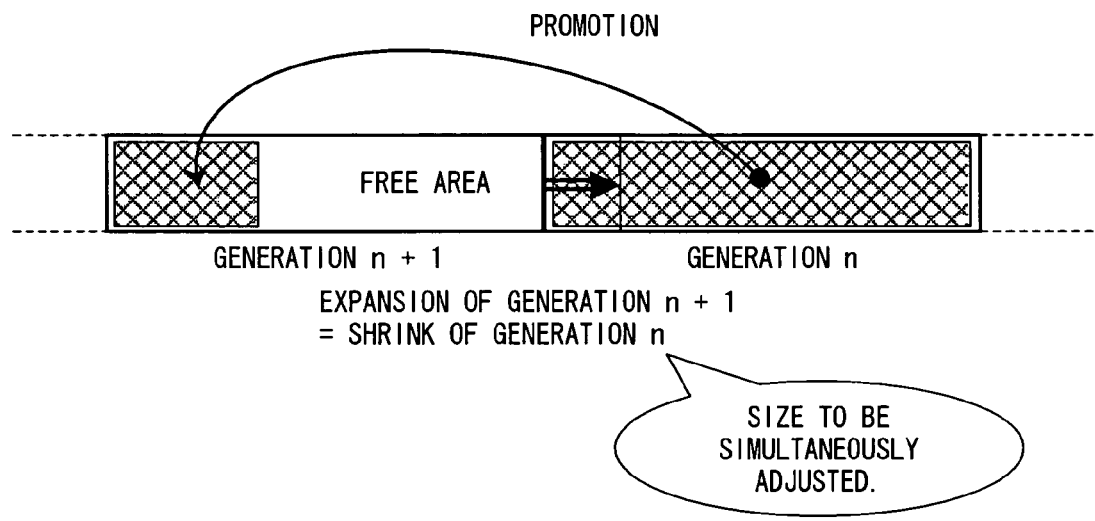
F I G. 8

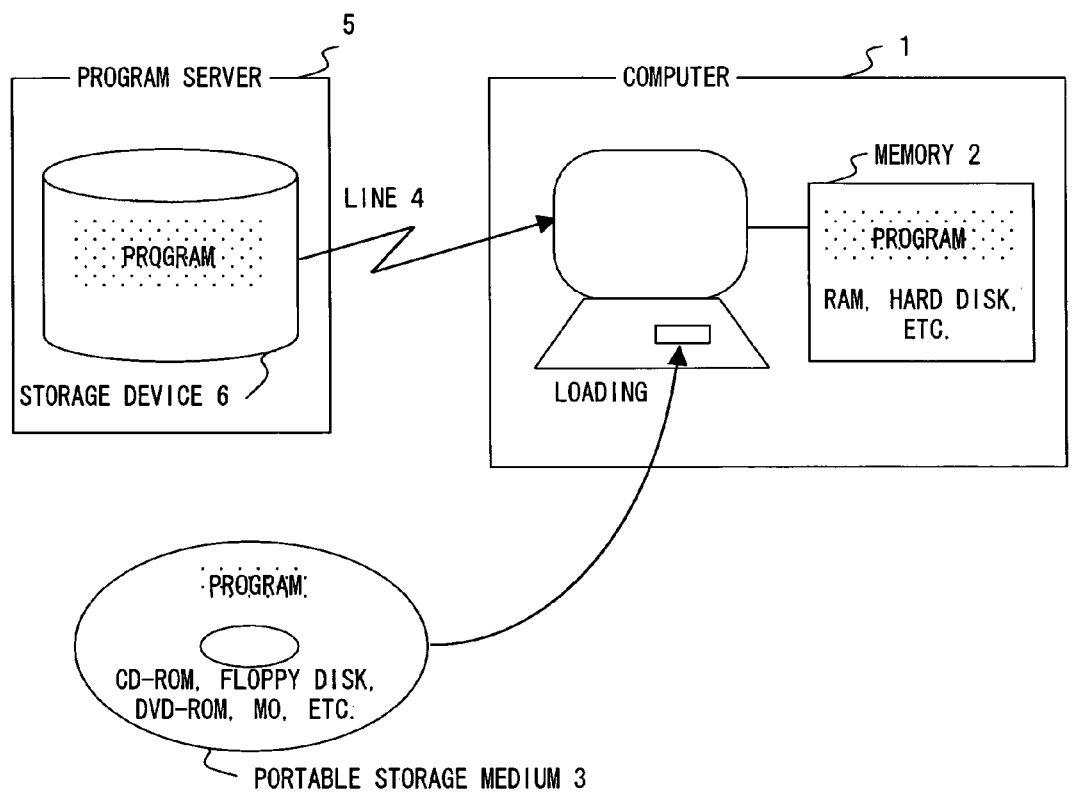
F I G. 1 7

COMPUTER-READABLE STORAGE MEDIUM STORING GENERATIONAL GARBAGE COLLECTION PROGRAM

BACKGROUND OF THE INVENTION

1. Field of the Invention

The present invention relates to a technology of effectively using virtual memory resources in a computer system implementing a generational garbage collection.

2. Description of the Related Art

One of the memory managing functions implemented in a computer system can be generational garbage collection (hereinafter referred to as GC). The GC is a function of automatically releasing an area which has become unnecessary in a memory area dynamically reserved by a program. The GC can come in various types depending on the algorithm such as a mark sweep type, a copy type, a train type, a parallel type, a concurrent type, etc., and any of these algorithms can be combined as generational GC.

The generational GC divides a memory space used by an application program (hereinafter referred to simply as an application), and classifies the divided spaces depending on the life of an object (generation), thereby improving the collection efficiency of dead objects per process unit. A short-lived object marks a high collection probability, and a long-lived object marks a low collection probability.

The generational GC performs a process with a virtual memory space allocated independently for each generation. For example, when the generational GC covers two generations, for example, a new generation and an old generation, a virtual memory space is independently allocated to each of the new and old generations. Although a virtual memory space is not prescribed for generational GC, a virtual memory space is independently allocated to each generation.

Relating to the generational GC, for example, Japanese Published Patent Application No. 2001-184219 (hereinafter referred to as "patent document 1") describes a method of determining a generation area to be allocated by analyzing a source program including an instruction to reserve a dynamic variable area for a dynamic variable, and analyzing a variable characteristic about the existence of a dynamic variable when a dynamic variable area is allocated to any of a plurality of generation areas.

When a computer system representing a memory address of 32 bits is used, a virtual memory space can acquire 4 GB (gigabytes) at most. However, since a virtual memory space is normally distributed to the OS (operating system) and other computer systems, and also to the instruction, data, stack area in the computer system, the capacity is practically smaller than 4 GB.

For example, in the computer system implementing two-generation generational GC of, for example, a new generation and an old generation, if the computer system can use the entire virtual memory space, 1 GB of virtual memory space is allocated to the new generation and 3 GB of virtual memory space is allocated to the old generation, when the computer system is initialized, then the virtual memory space is allocated independently to each generation. Therefore, the virtual memory space cannot be dynamically reallocated although it is determined that the memory of as much as 3 GB is unnecessary for the old generation and a higher process efficiency can be attained by committing (actually allocating existing memory resources to a virtual memory space) the memory of 2 GB to the new generation during the operation. Accordingly, in this case, the operation of the computer system is reactivated and the virtual memory space is reallocated, or the process is continued with the current allocation of the virtual memory space and the current inefficient rate. This is the problem with the computer system implementing the generational GC of three or more generations, and also with the system described in the above-mentioned patent document 1.

SUMMARY OF THE INVENTION

The present invention has been developed to solve the above-mentioned problems and aims at providing a computer-readable storage medium storing a generational garbage collection program for dynamically adjusting the virtual memory space size of each generation in the generational GC implemented in the computer system.

To attain the above-mentioned objective, the storage medium according to an aspect of the present invention is a computer-readable storage medium storing a generational garbage collection program used to direct a computer to perform a generational garbage collection process. The generational garbage collection process includes a generational GC environment preparing and initializing process. The generational GC environment preparing and initializing process includes acquiring a single virtual memory space as a virtual memory space of all generations, and distributing the single virtual memory space to each generation such that the virtual memory space of each generation can be continuously arranged in the order of generation in the single virtual memory space.

According to the computer-readable storage medium storing the generational garbage collection program, the boundary between generations in the single virtual memory space can be dynamically varied (floated), and the size of the virtual memory space of each generation can be adjusted.

BRIEF DESCRIPTION OF THE DRAWINGS

FIG. 8 is an imaginary view obtained when promotion is performed in the GC process on a target generation of S2a:

FIG. 17 shows an example of a computer-readable storage medium for reading a stored generational GC program.

DESCRIPTION OF THE PREFERRED EMBODIMENT

Figure 1:
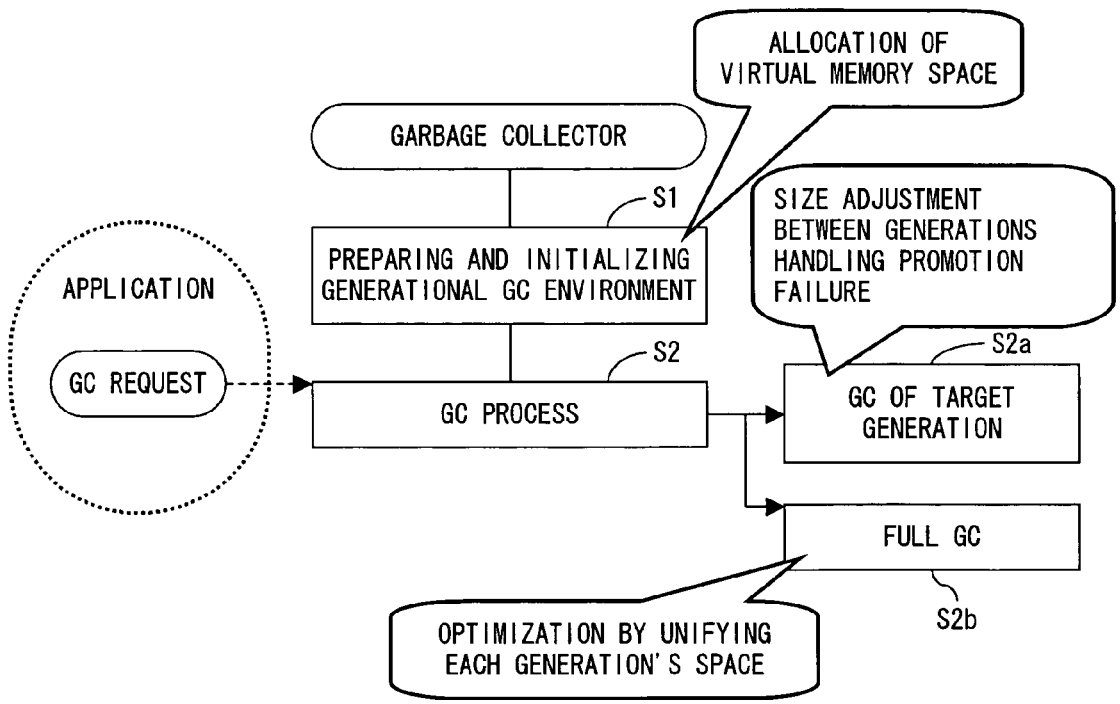
FIG. 1 is a flowchart showing the outline of the garbage collector process by the generational GC implemented by a computer system.

The embodiments of the present invention are explained below by referring to the attached drawings. FIG. 1 is a flowchart showing the outline of the garbage collector process by the generational GC implemented by a computer system. This process is performed by the CPU reading and executing a generational GC program according to the present embodiment and stored in the ROM in the memory management unit having the CPU, ROM, etc. in the computer system.

As shown in FIG. 1, in the present process, the generational GC environment preparing and initializing process is first performed, (S1), and then the GC process (2*a*) on a target generation (short of memory) or the full (collectively on the entire generations) GC process (S2*b*) is performed as the GC process (S2) corresponding to the GC request due to the shortage of memory from an application.

As the detailed explanation is given below, the process of allocating the single virtual memory space to each generation is performed in S1, and a size adjusting process among the generations, a promotion failure handling, etc. are performed in the single virtual memory space in S2*a*. Furthermore, in the above-mentioned S2*b*, the optimizing process, etc. by unifying the spaces among the generations such as the process of filling the gap among the generations, the resizing process for each generation, etc. are performed in the single virtual memory space. In the following explanation, to allow the present invention to be more easily understood, the above-mentioned processes are explained in comparison with the conventional processes.

First, the generational GC environment preparing and initializing process of S1 is explained below.

In the generational GC, it is assumed that a virtual memory space of each generation can be independently managed. Therefore, in the conventional generational GC environment preparing and initializing process, a virtual memory space is independently allocated to each generation.

Figure 2:
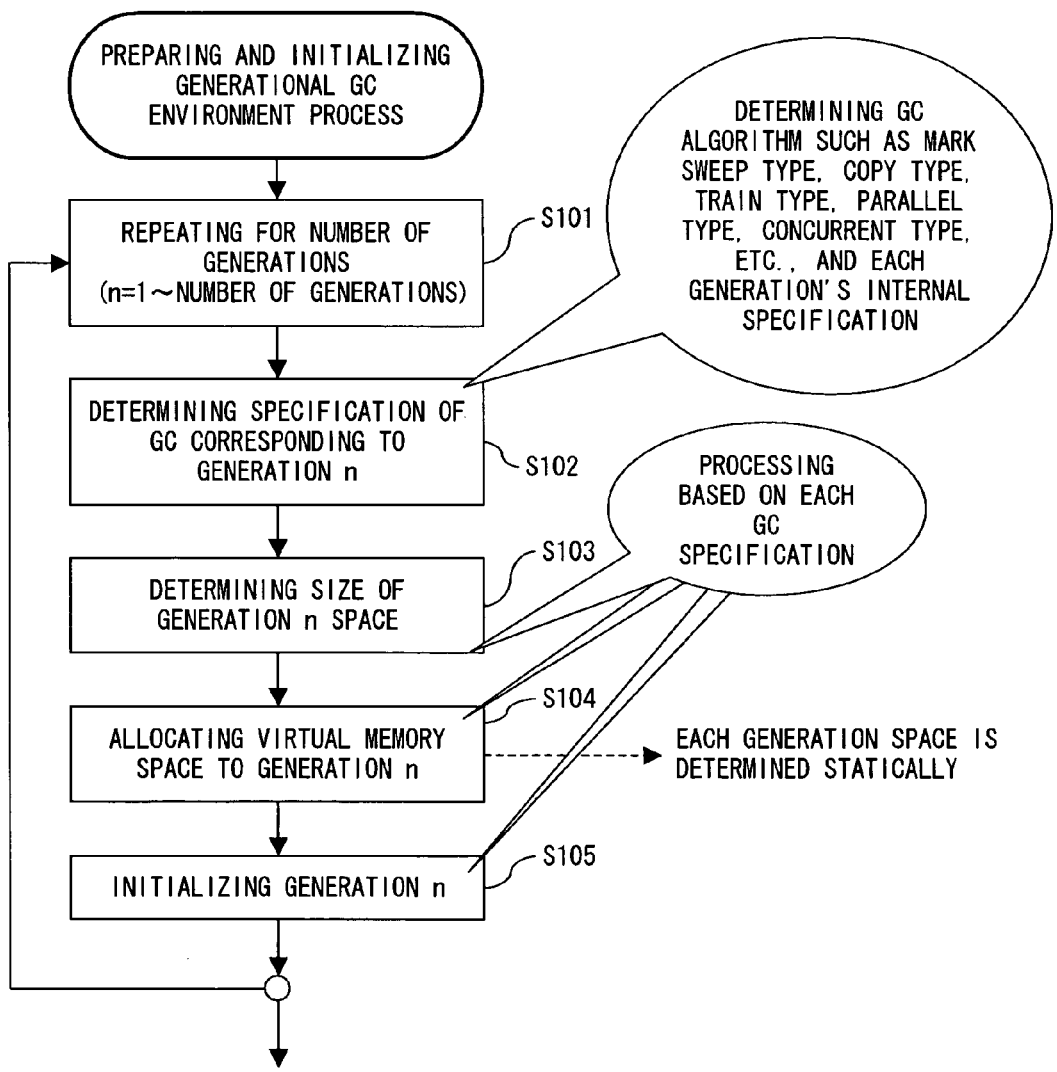
FIG. 2 is a flowchart of the conventional generational GC environment preparing and initializing process.

FIG. 2 is a flowchart of the conventional generational GC environment preparing and initializing process. As shown in FIG. 2, in the process flow, the process of determining the specification of the GC on the generation n (S102), the process of determining the area size (virtual memory space size) of the generation n (S103), the process of allocating a virtual memory space to the generation n (S104), and the initializing process on the generation n (S105) are performed on each n after defining n=1 (number of generations (total number of generations) (S101).

In S102, the GC algorithm such as a mark sweep type, a copy type, a train type, a parallel type, a concurrent type, etc., and the each generation's internal specification are determined. In S103 to S105, the processes are performed based on the specification of the GC determined in S102. In S104, the virtual memory space of the generation n is statically determined.

Thus, since the processes are conventionally performed completely independently on each generation, the virtual memory space allocated to each generation is independent of each other.

Figure 3:
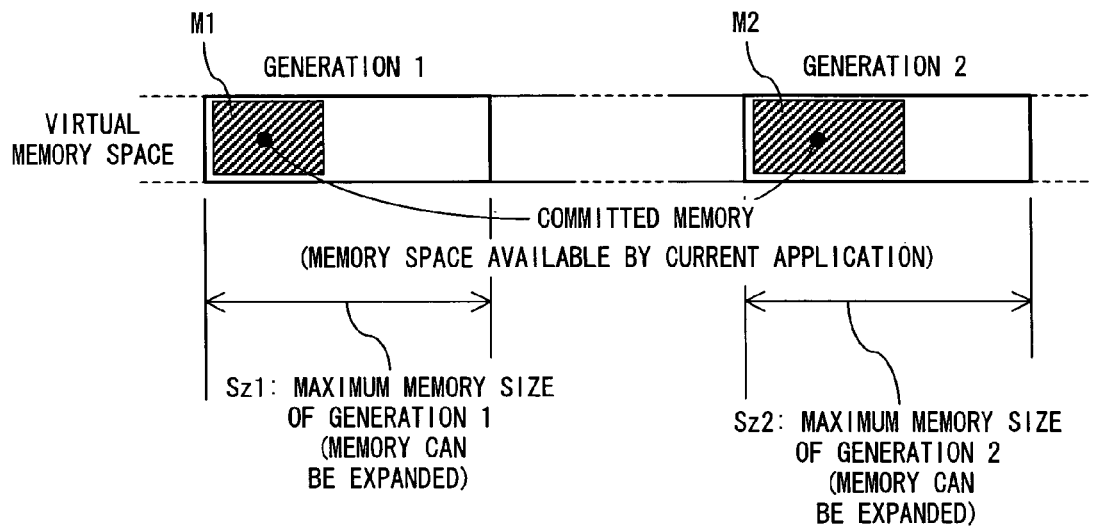
FIG. 3 is an imaginary view of the allocation of a virtual memory space by the conventional generational GC environment preparing and initializing process.

FIG. 3 is an imaginary view of the allocation of a virtual memory space by the conventional generational GC environment preparing and initializing process shown in FIG. 2. In FIG. 3, the number of generations is defined as 2, but the process is similarly performed with the number defined as 3 or more.

As shown in FIG. 3, when the conventional generational GC environment preparing and initializing process is performed, a virtual memory space is allocated independent of each generation (generations 1 and 2).

In FIG. 3, Sz1 and Sz2 indicate the sizes (maximum memory size) of the virtual memory spaces respectively allocated to the generations 1 and 2. M1 and M2 indicate the areas of memory (actually existing memory resources) respectively committed to the virtual memory space of the generations 1 and 2, that is, the memory area in which the current application is available. Since the memory practically used by an application is used by the entire system, it is the long-established method not to make a commitment to a virtual memory space during operation until it is necessary.

Thus, since each virtual memory space is conventionally allocated to each generation, the virtual memory space of each generation cannot be dynamically increased when a finite virtual memory space is distributed to each generation in advance although the memory can be increased during the execution of an application up to the maximum memory size statically determined in the virtual memory space of each generation. Therefore, there can be a case where the optimum virtual memory space cannot be distributed and an unstable operation is necessarily performed.

In the generational GC environment preparing and initializing process in S1 shown in FIG. 1, the following process is performed to realize the virtual memory space of each generation as the single virtual memory space.

Figure 4:
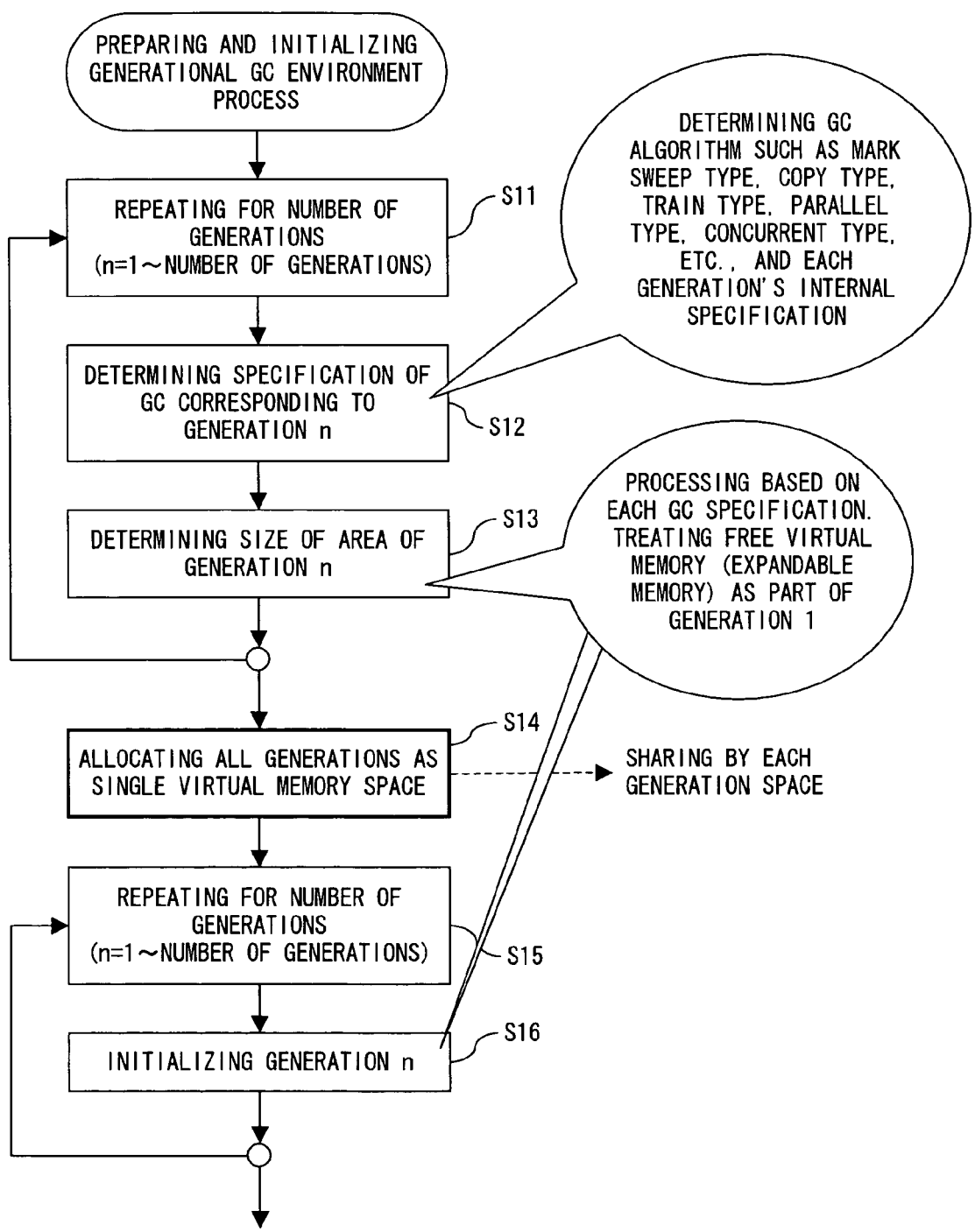
FIG. 4 is a flowchart of the generational GC environment preparing and initializing process of S1.

FIG. 4 is a flowchart of the generational GC environment preparing and initializing process of S1. As shown in FIG. 4, in the present process flow, the process of determining the specification of the GC on the generation n (S12), and the process of determining the area size (virtual memory space size) of the generation n (S13) are performed on each n after defining n=1 (number of generations (total number of generations) (S11) In S12, the GC algorithm such as a mark sweep type, a copy type, a train type, a parallel type, a concurrent type, etc., and the each generation's internal specification are determined. In S13, the processes are performed based on the specification of the GC determined in S12.

When the processes in S11 through S13 are completed, the single virtual memory space is allocated to the entire generations (S14). Practically, a single virtual memory space is acquired as a virtual memory space for the entire generations, and the single virtual memory space is distributed to each generation such that a virtual memory space of each generation can be contiguously arranged in the order of generation in the single virtual memory space. Thus, each generation shares the single virtual memory space.

Then, an initializing process (S16) is performed on the generation n on each n after defining n=1 (number of generations (total number of generations) (S15). In S16, a process is performed based on the specification of the GC of the generation n determined in S12. The virtual memory space to which memory is not committed is added to the generation 1 (newest generation). That is, in the single virtual memory space allocated in S14, the memory is committed to the single virtual memory space such that a space to which memory is committed is provided as a contiguous space and a space can be provided for the newest generation when there is the space to which memory is not committed.

Thus, according to the present process flow, unlike the conventional method of acquiring a virtual memory space independent of each generation, a single virtual memory space is allocated as a virtual memory space of the entire generations.

Figure 5:
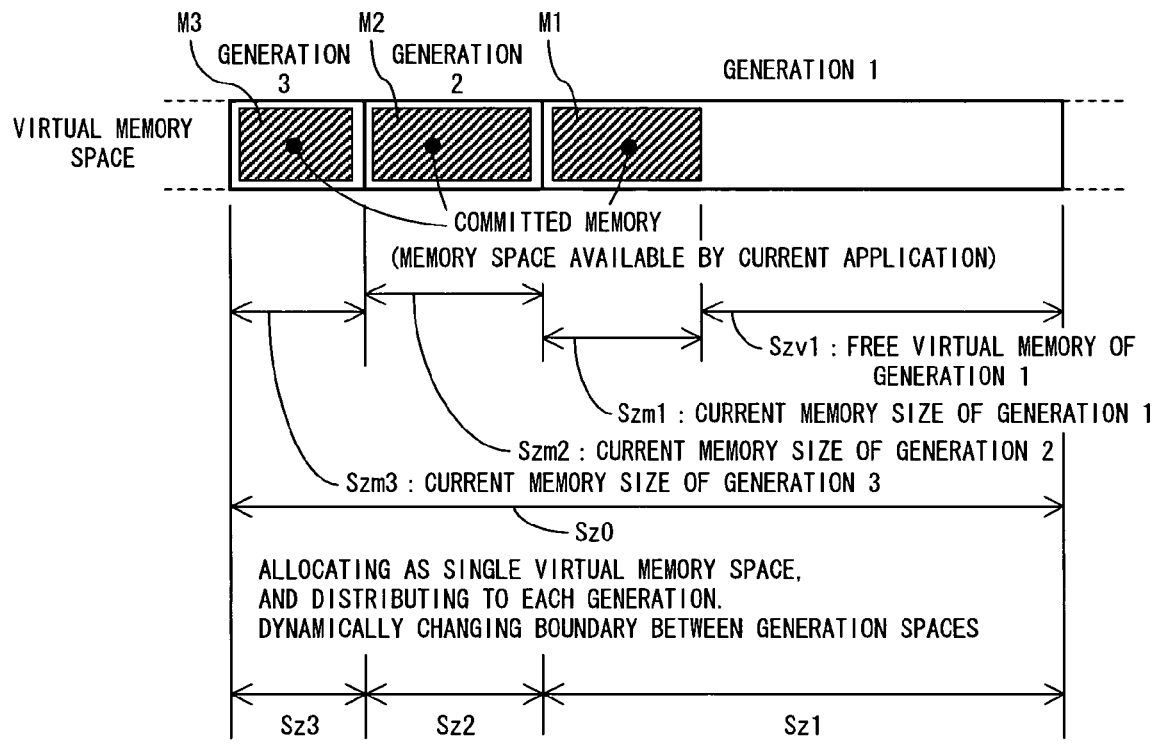
FIG. 5 is an imaginary view of the allocation of a virtual memory space by the generational GC environment preparing and initializing process of S1.

FIG. 5 is an imaginary view of the allocation of a virtual memory space by the generational GC environment preparing and initializing process shown in FIG. 4. In FIG. 5, the number of generations is 3, but it can be 2, or 4 or more.

As shown in FIG. 5, when the generational GC environment preparing and initializing process shown in FIG. 4 is performed, the single virtual memory space is allocated to the entire generations (generations 1, 2, and 3), and the single virtual memory space is distributed to each generation, thereby allocating a virtual memory space for each generation. Thus, the boundary of the virtual memory space among the generations can be dynamically changed.

In FIG. 5, Sz0 indicates the size of the single virtual memory space allocated to the entire generations. Sz1, Sz2, and Sz3 indicate the sizes of the virtual memory spaces respectively distributed to the generations 1, 2, and 3. M1, M2, and M3 respectively indicate the areas of the memory committed to the virtual memory spaces allocated to the generations 1, 2, and 3, that is, the memory areas available by the current application. In the following explanation, the space (area) to which the memory is committed in the virtual memory space of the generation n is also referred to as a generation space n. Therefore, for example, the spaces of M1, M2, and M3 shown in FIG. 5 are also referred to generation spaces 1, 2, and 3. Szm1, Szm2 (=Sz2), Szm3 (=Sz3) respectively indicate the sizes of the memory committed to the virtual memory spaces of the generations 1, 2, and 3. Szv1 (=Sz1−Szm1) indicates the size of the space to which the memory is not committed in the virtual memory space allocated to the generation 1. The space to which the memory is not committed is a formal space. That is, a space to which the memory is not committed is only added to the generation 1 (newest generation) in the single virtual memory space allocated to the entire generations. Therefore, the space is available (expanded) by the entire generations.

The size of the virtual memory space of each generation is compared with the conventional case. Conventionally, as shown in FIG. 3, the total size of the virtual memory spaces of the generations is an available size of the virtual memory space. That is, the size of the virtual memory space of each generation determined by the conventional generational GC environment preparing and initializing process shown in FIG. 2 cannot be more dynamically expanded. For example, in FIG. 3, when Sz1+Sz2=100, Sz2=50, and SZ2=50, the maximum memory size of the generation 1 is 50, and the maximum memory size of the generation 2 is 50.

On the other hand, in the generational GC environment preparing and initializing process shown in FIG. 4, the boundary between the generations can be changed as shown in FIG. 5, and all (Sz0) of the virtual memory space can be distributed to any generation. For example, in FIG. 5, when Sz1+Sz2+Sz3=100 (=Sz0), the distribution size of each generation is variable. Therefore, the maximum memory size of the generation 1 can be 100, or the maximum memory size of the generation 2 or generation 3 can be 100. However, the total value (Sz1+Sz2+Sz3) is constantly 100.

Assume that, in FIG. 5, the generation 1 is the newest generation and the generation 3 is the oldest generation, and the left side is a low address side and the right side in is a high address side, and the newer generation is arranged at the higher address side for the following reason. That is, the older generation, the higher probability that there is a long-lived object, thereby lowering the collection efficiency. Accordingly, it is a loss in performance to move a long-lived object each time GC is performed. On the other hand, the newer generation, the higher probability that there is a short-lived object, thereby improving the collection efficiency. As a result, the movement of an object is naturally active. Furthermore, when an object at the low address side moves, the influence (movement) is given to all objects at the higher address side than the object. Therefore, it is desired to a longer-life object is promoted to the low address side so that the frequency of movement of an object at a lower address side can be lower. Therefore, the newer generation, the higher address side in arrangement.

A promotion refers to a rise of an alive object to an older generation, and is accompanied by physical movement. As means for moving an object, in addition to a promotion, a slide due to compaction, a copy by copying GC/train GC, etc. Especially when a slide is performed, it is similarly desired to move an object to a low address side. However, since it depends on the specification of the GC closed to the internal generation, determination cannot be definitely made. A slide refers to a method of compressing an alive object in the same generation space. To be practical, it is to remove a fragmentation to put the alive object at the lower address side.

Figure 6:
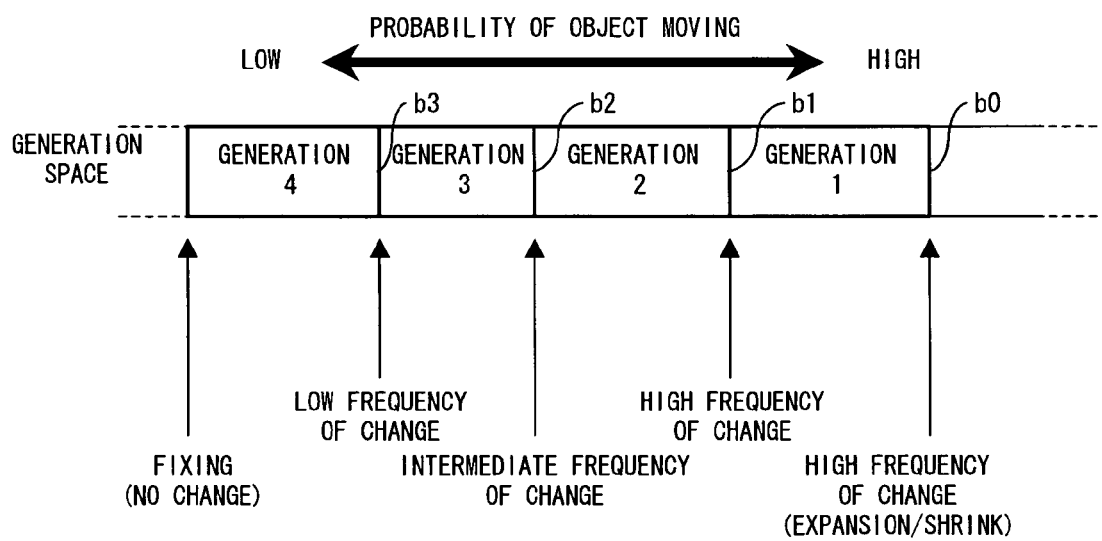
FIG. 6 shows the relationship between the movement probability of an alive object and the variation of the boundary between the generations in each generation space provided by the generational GC environment preparing and initializing process of S1.

FIG. 6 shows the relationship between the movement probability of an alive object and the variation of the boundary between the generations in each generation space provided by the generational GC environment preparing and initializing process shown in FIG. 4. In FIG. 6, the number of generations is 4, but the number can be 2, 3, or 5 or more. In FIG. 6, it is assumed that the left side is a low address side and the right side is a high address side, and the generations are older from the generation 1 to the generation 4.

As shown in FIG. 6, the generation space of the newer generation has the higher movement probability of an alive object. Therefore, at the boundaries b1, b2, and b3 between the respective generation spaces, the boundary at the higher address side (b1 side) has the higher variation frequency. At the boundary b0 between the generation space 1 and the space to which the memory is not committed, the variation frequency becomes higher by the addition and release of the memory.

In the explanation above, the newer generation is arranged at the higher address side. However, if the level of the address is viewed from a different angle, the newer generation can be arranged at the lower address side. That is, it can be arranged depending on the life (generation) of an object.

Next, described below are the GC process of the target generation of S2a shown in FIG. 1 and the full GC process of S2b.

Generally, in the generational GC, an dead object is collected by the following two representative means. That is, one means is GC in an optional generation space (corresponding to the GC process of the target generation of the above-mentioned S2a), and another means is GC performed collectively for the entire generations (corresponding to the full GC process of S2b described above). The former GC cannot collect all dead objects used by an application. However, since the GC target is narrow, the process cost can be low. On the other hand, the latter GC can collect all dead objects. However, since the GC target is broad, the process cost is high. In the former GC, as a result of the process, the balance of the sizes between generation spaces cannot be appropriately maintained (unstable). Accordingly, the latter GC is to be selected, and it is disadvantageous in performance. Therefore, In the former GC, the above-mentioned undesired condition is to be avoided by adjusting the sizes between generation spaces.

If a generation space is a GC target, an dead object is collected, and an alive object is promoted to the generation space of an older generation, then the available size in the generation space of the promotion target is decreased.

Figure 7:
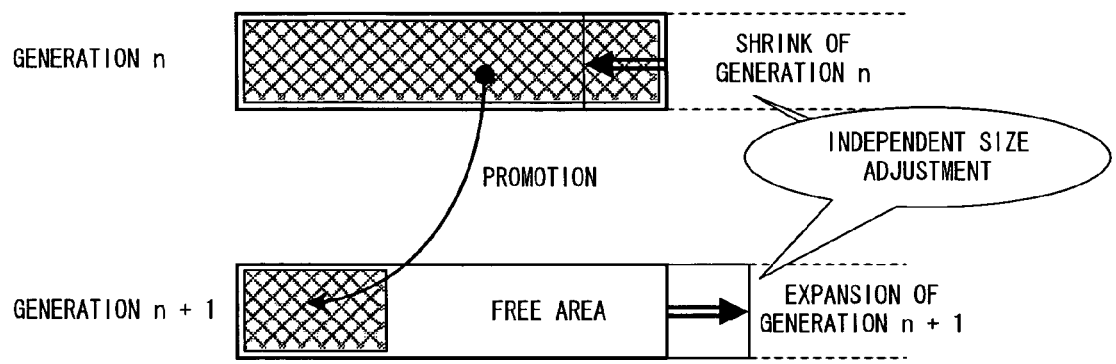
FIG. 7 is an imaginary view obtained when promotion is performed in the conventional GC process on a target generation.

FIG. 7 is an imaginary view obtained when promotion is performed in the conventional GC process on a target generation. In FIG. 7, the number of generations is 2. However, when it is 3 or more, and the generations are partially viewed, the relationship between two generations (generation 1" generation 2, generation 2" generation 3, . . . ) can be expressed. Therefore, in this example, it is assumed that the number of generations is 2 in the following explanation (the same as in FIGS. 8 through 10).

As shown in FIG. 7, assuming that the GC target is a generation n, an dead object is collected by performing the GC process on the generation space of the generation n, and when an alive object is promoted to the generation space of the generation n+1 of an old generation, the size of the available area (free area) of the generation space of the generation n+1 is decreased.

If the size adjustment of a generation space is taken into account, a size adjustment can be independently performed on the generation space of each generation because the virtual memory space is independently provided in the conventional method. Therefore, the size adjustment of a generation space can be independently performed in each generation by expanding the generation space of the generation n+1 (in the range of an allocated virtual memory space), shrinking the generation space of the generation n, etc.

FIG. 8 is an imaginary view obtained when promotion is performed in the GC process on a target generation of S2$a$ shown in FIG. 1.

As shown in FIG. 8, assuming that the GC target is a generation n, an dead object is collected by performing the GC process on the generation space of the generation n, and when an alive object is promoted to the generation space of the generation n+1 of an old generation, the size of the available area (free area) of the generation space of the generation n+1 is decreased.

If the size adjustment of a generation space is taken into account, the size adjustment of the generation space of each generation cannot be independently performed because the generation spaces of the generation n and the generation n+1 are contiguously provided. Therefore, when the generation space of the generation n+1 is to be expanded, it is necessary to perform the size adjustment between the generation spaces by simultaneously shrinking the generation space of the generation n by the same size, etc.

Generally, when the GC process is performed on the generation space of the generation n as a GC target, the size of the generation space of the generation n +1 is expanded such that the size of the free area of the generation space of the generation n+1 can be larger than the size of the generation space of the generation n to realize the promotion although all objects of the generation n exist similarly after the next GC process on the generation space of the generation n. However, the total amount of the alive objects after the GC process is performed on the generation space of the generation n as a GC target corresponds to only a part of the entire generation space of the generation n. Therefore, if the size (survival rate) can be estimated in advance, it is not necessary to prepare the generation space of the generation n as the size of a free area of the generation space of the generation n+1. The GC process on a target generation of S2$a$ as shown in FIG. 1 realizes it by a promotion failure handling described later.

Figure 9:
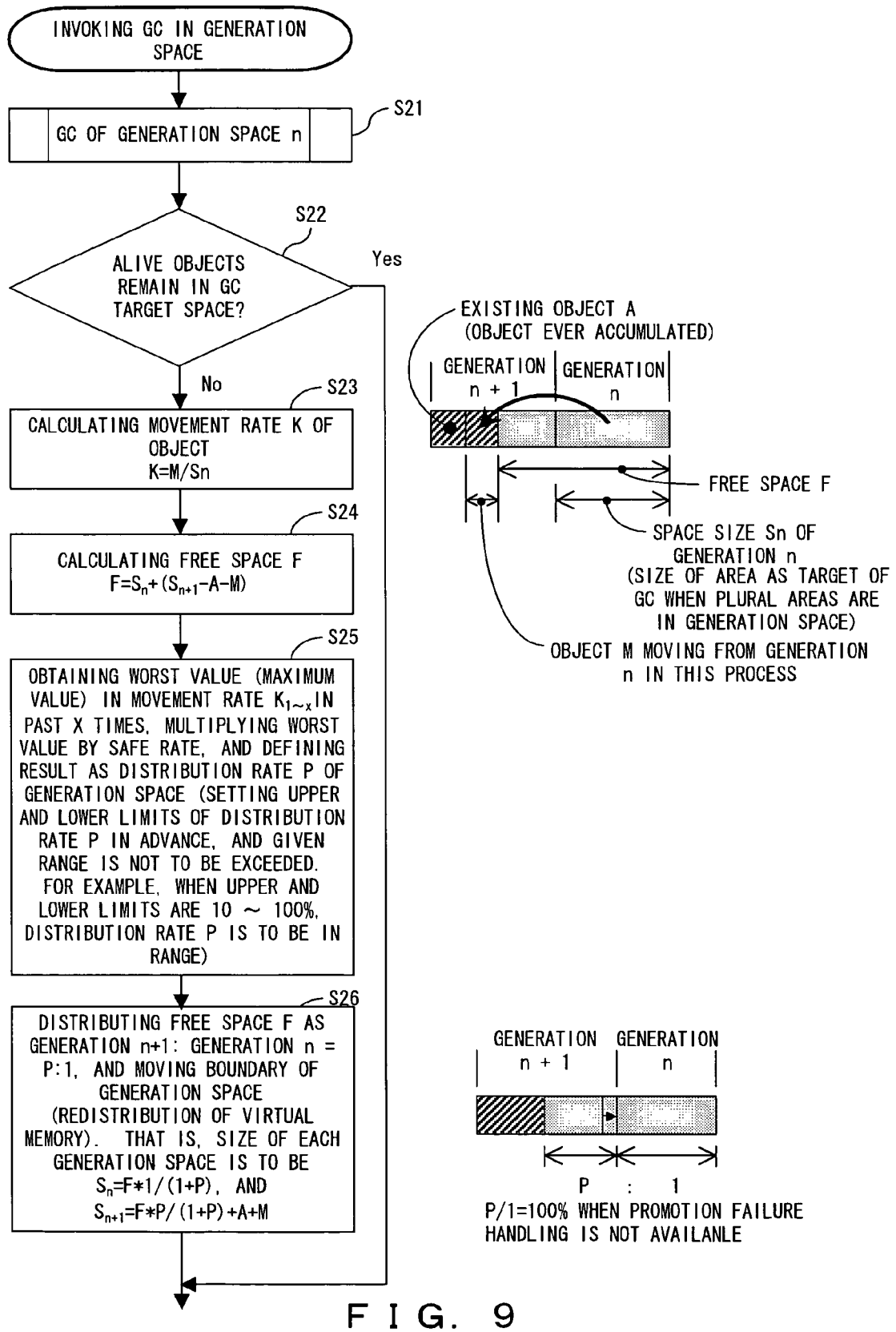
FIG. 9 is a flowchart of the GC process on a target generation of S2a and an imaginary view of the virtual memory space during the process.

FIG. 9 is a flowchart of the GC process on a target generation of S2$a$ shown in FIG. 1 and an imaginary view of the virtual memory space during the process.

As shown by the flowchart in FIG. 9, when GC in the generation space is announced on the generation n at a request from an application, the GC process is first performed on the generation space n (S21). In S21, in the generation space n, an dead object is collected and promoted. When the promotion is not successfully performed, the promotion failure handling described later is performed.

Then, it is determined whether or not an alive object remains in the GC target space of the generation space n (S22). The GC target space refers to a generation space n itself when the generation space n is a single heap space. When the generation space n has a plurality of heap spaces, it refers to an optional heap space as a GC target.

If all alive objects of the GC target space are all promoted as the specification of the GC of the generation space, the determination in S22 is constantly NO (false), and the determining process is unnecessary.

In the determination in S22, if the determination result is YES, the processes in S23 through S26 are skipped. If it is NO, the size adjusting process between the generation spaces as the processes in S23,through S26 is performed.

In detail, first, the movement rate K of the alive object from the generation space n to the generation space n+1 by the promotion in S21 is calculated by the following equation (1) (S23).

$$K = M/Sn \quad (1)$$

where M indicates the size of the alive object moving from the generation space n by the promotion, and Sn indicates the size of the generation space n. However, the generation space n has a plurality of areas (heap spaces), it indicates the size of the heap space as a GC target.

Then, the free space (free area size) F in the generation space n and the generation space n+1 is calculated by the following equation (2) (S24).

$$F = Sn + (Sn+1 - A - M) \quad (2)$$

where Sn+1 indicates the size of the generation space n+1, and A indicates the size of the objects which have been accumulated.

Then, the worst value (maximum value) is obtained in the movement rates K1~x (K1 indicates the calculation value K of this time) of the past x times, and is multiplied by a safe rate and the distribution rate P of the generation space is allocated (S25). In this case, the distribution rate P is calculated by the following equation (3). The upper and lower limits are set in advance, and the distribution rate P does not exceed the range. For example, when the upper and lower limits are 10 (100%, the distribution rate P is to be in the range.

$$P = (\text{worst value of K1}\sim x) * \text{safe rate} \quad (3)$$

where x indicates the number for storing the past movement rate as an experimental value. For example, there are three to five values. The safe rate is normally to be 1.5. The lower the safe rate, the more efficiently the heap space can be utilized. The higher it is, the higher probability of the next successful GC process in the generation space. When the process fails, the full GC is invoked.

Then, the free space F calculated in S24 is distributed such that the expression of "generation n+1: generation n =P: 1" can be realized, and the virtual memory space is redistributed by moving the boundary between the generation spaces (S26). In this case, the size Sn of the generation space n is calculated by the equation (4), and the size Sn+1 of the generation space n+1 is calculated by the following equation (5)

$$Sn=F*1/(1+P) \qquad (4)$$

$$Sn+1=F*P/(1+P)+A+M \qquad (5)$$

In S21 described above, when the promotion failure handling described later is not performed, P/1=(100%).

When a promotion is performed, it is necessary as described above that there is a sufficient free area in the generation space at the promotion target. If there is not sufficient free area, it means unsuccessful GC process in the generation space. Therefore, before a failure, the GC in the generation space at the promotion target or the full GC is invoked so that there can be a sufficient free area in the generation space at the promotion target. Otherwise, the application stops for the shortage of memory.

Figure 10:
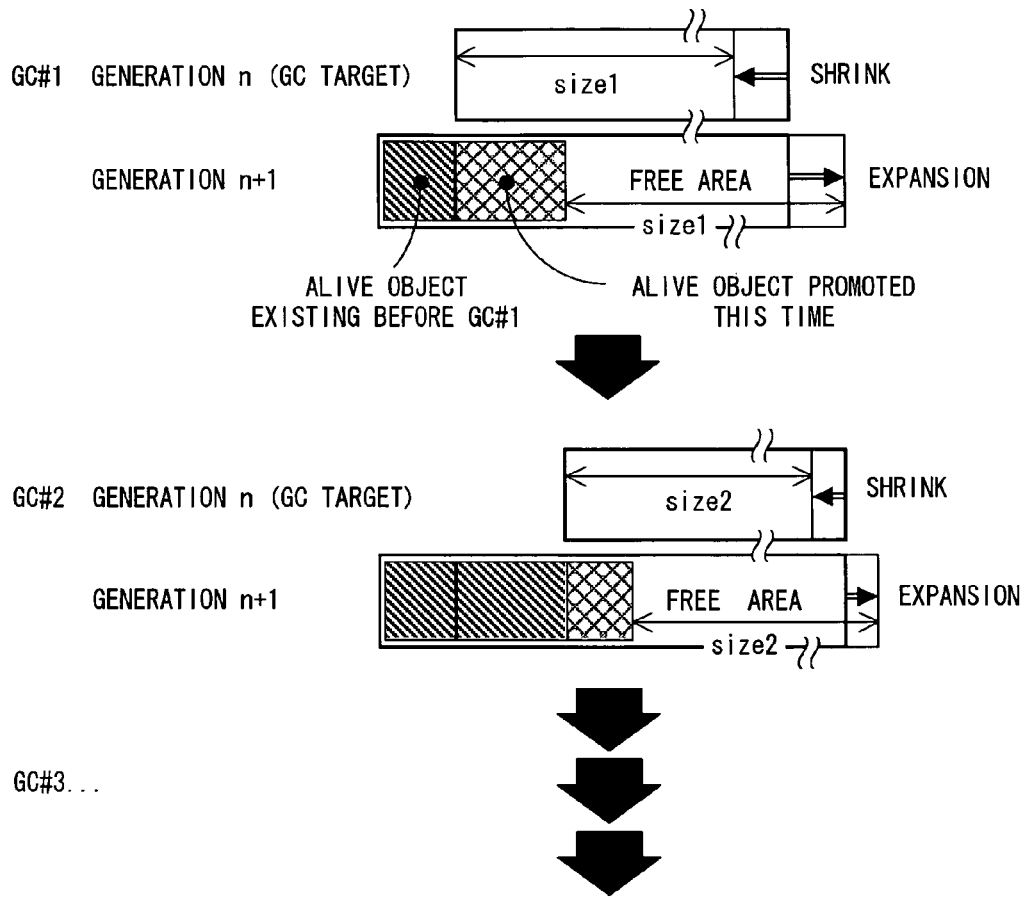
FIG. 10 is an imaginary view of the variation of a generation space by the promotion in the conventional GC process on a target generation.

FIG. 10 is an imaginary view of the variation of a generation space by the promotion in the conventional GC process on a target generation.

As shown in FIG. 10, if there is the size of the generation space of the generation n as the size of the free area of the generation space of the generation n+1 as a promotion target for each GC process in a form of the first GC process (GC#1), the second GC process (GC#2), the third GC process (GC#3), . . . with the GC target generation defined as a generation n, then the GC process of the generation n is to be successfully performed.

Fundamentally, a free area of a generation space at a promotion target is to be provided for the number of alive objects in the GC target generation, but it is not possible to correctly estimate the number of alive objects before starting a GC process. Therefore, as shown in FIG. 10, there is a free area as large as the generation space of the generation n so that there is no problem with the 100% of alive objects which refers the worst value (=safe value) in the conventional method.

On the other hand, in the GC process of the generation space in S21 shown in FIG. 9, when there is a shortage of free area of the generation space at the promotion target, the reference to the objects as GC target generations is consistently restored and maintained as is, and the GC in the generation space of the old generation or the promotion failure handling for invoking the full GC can be performed. Therefore, the free area prepared at the promotion target can be calculated by a multiplication by the ratio of the alive objects statistically promoted in the past. That is, if 5% of the generation space of the GC target generation was promoted in the past, the free area is to be at most 5 (10% of the generation space of the GC target generation. If there is a shortage of a free area at the promotion target and the GC process of the generation space is unsuccessful, the reference to the objects as the GC target generation can be restored. Therefore, in the GC process of the generation space in S21 above, it is not necessary to prepare a free area as large as the generation space of the GC target generation in the generation space at the promotion target, and there is the possibility that the occurrence frequency of a GC process can be reduced because the memory area utilization of the generation space is improved.

Figure 11:
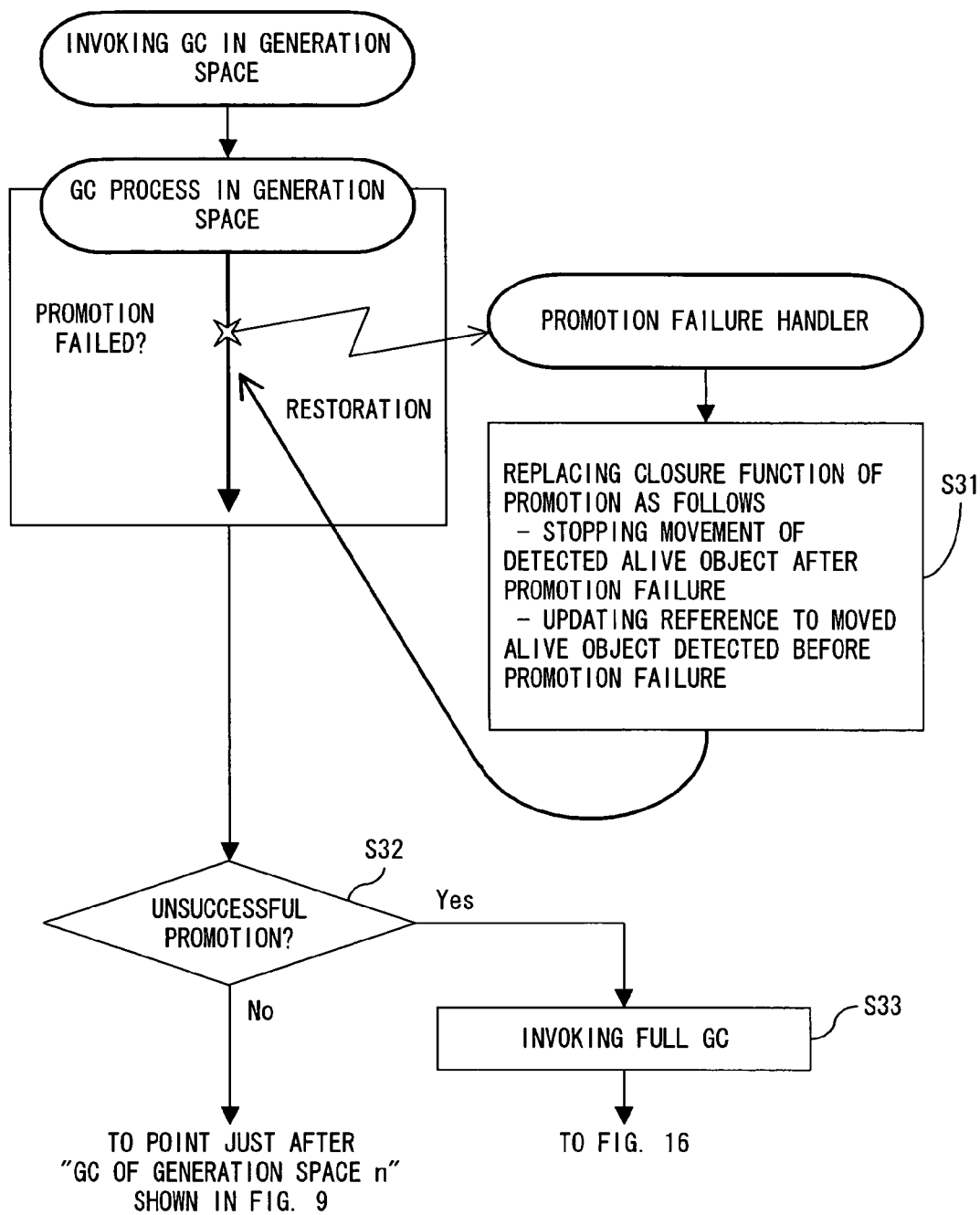
FIG. 11 is a flowchart of the GC process of the generation space of S21 including the promotion failure handling.

FIG. 11 is a flowchart of the GC process of the generation space of S21 shown in f9 including the promotion failure handling.

As shown in FIG. 11, if a promotion fails due to a shortage of a free capacity of the generation space n+1 at the promotion target when the GC in a generation space is invoked and the GC process is being performed on the generation space n, a promotion failure handling (S31) is performed.

In the promotion failure handling (S31), the closure function of promotion is replaced and processed as follows. That is, after the promotion failure, the movement of the detected alive objects is stopped, and the reference to the alive objects detected (moved) before the promotion failure is updated to the movement destination.

When the promotion failure handling (S31) is completed, the process is resumed, and it is determined whether or not the promotion has failed (S32). If the determination result is YES, the full GC is invoked, control is passed to the full GC process shown in FIG. 16 described later. If it is NO, control is passed to S22 shown in FIG. 9 described above.

In these processes, although there is a shortage of a free area at the promotion target, the process can be continued without stopping the application.

The style of the promotion in the GC process in the generation space can be classified into two types, that is, a sequential movement type (copying GC, etc.) and a collective movement type (mark sweep GC, etc.) according to the movement timing of an object. In the sequential movement type, an object is moved simultaneously when an alive object is detected. Therefore, it is necessary to restore the reference to the moved objects when a promotion fails. On the other hand, in the collective movement type, objects are collectively moved after alive objects are all detected. Therefore, since it is determined whether or not a promotion is successful before an object is moved, it is not necessary to restore the reference. As a result, in the promotion failure handling (S31) described above, the process is performed as described above when the type of the promotion is a sequential movement type, but nothing is performed and the process is restored in the case of the collective movement type.

Figure 12:
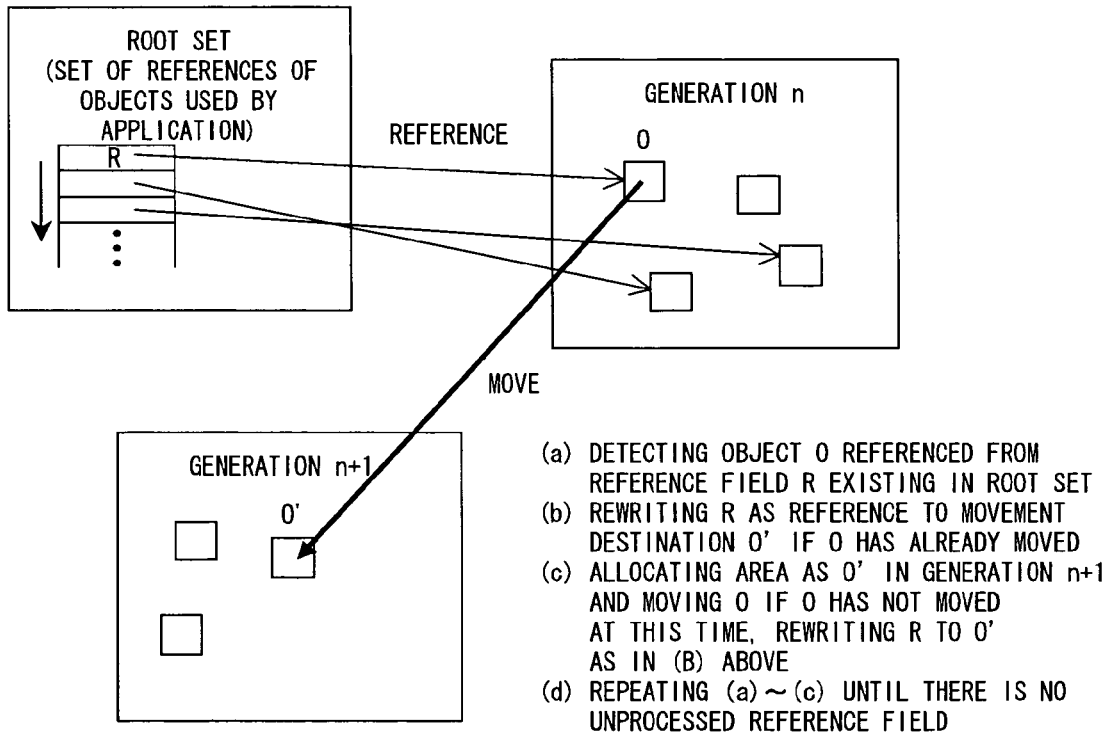
FIG. 12 is an imaginary view of the basic concept of the sequential movement promotion.

The basic concept of a promotion of the above-mentioned sequential movement type is explained by referring to the imaginary view shown in FIG. 12.

In FIG. 12, assuming that the GC target is a generation n, and the promotion target is a generation n+1, (a) an object O referenced from the reference field R existing in a root set as a set of references to the object being used by an application is detected in a promotion of the sequential movement type, and (b) if the object O has been moved to the generation n+1, then the reference field R is rewritten to the reference to the movement destination O(. Otherwise, (c) if the object O has not been moved to the generation n+1, an area is allocated as a movement destination O (in the generation space of the generation n+1, the object O is moved to the area, and the reference field R is rewritten to the reference to the movement destination O(. Then, (d) the above-mentioned processes (a) through (c) are repeated until there is no unprocessed reference field in the root set. Thus, in the sequential movement type, objects are moved simultaneously when alive objects are detected.

When there occurs a shortage of a free area of the generation space n+1, a promotion to a free area of the generation space n+2 (oldest generation space can be performed before performing a promotion failure handling.

Described below is the full GC process of S2b shown in FIG. 1.

In the conventional full GC process, since each generation is allocated to a different virtual memory space, it is necessary to repeat the processes for each generation space based on the same GC specification.

Figure 13:
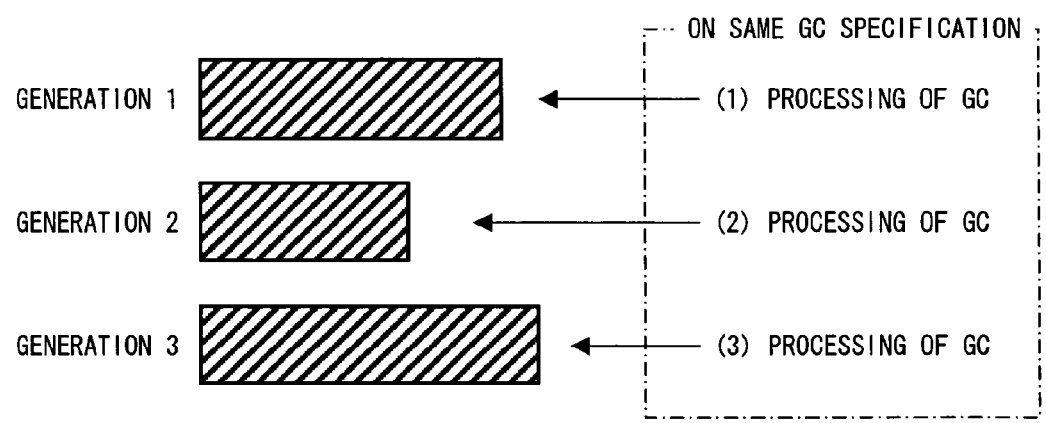
FIG. 13 is an explanatory view of the execution mode of the conventional full GC process.

FIG. 13 is an explanatory view of the execution mode of the conventional full GC process.

As shown in FIG. 13, for example, assuming that the number of generations is 3, the GC process is first performed on the generation space of the generation 1 based on the same GC specification in the conventional full GC process. Then, the GC process is performed on the generation space of the generation 2, then the GC process is performed on the generation space of the generation 3. Thus, the GC process has to be repeatedly performed for each generation space of the generations 1 through 3.

On the other hand, in the full GC process of S2b shown in FIG. 1, each generation space shares the single virtual memory space. Therefore, the GC process can be performed based on the same GC specification and a single memory space, thereby simplifying and enhancing the efficiency of the GC process.

Figure 14:
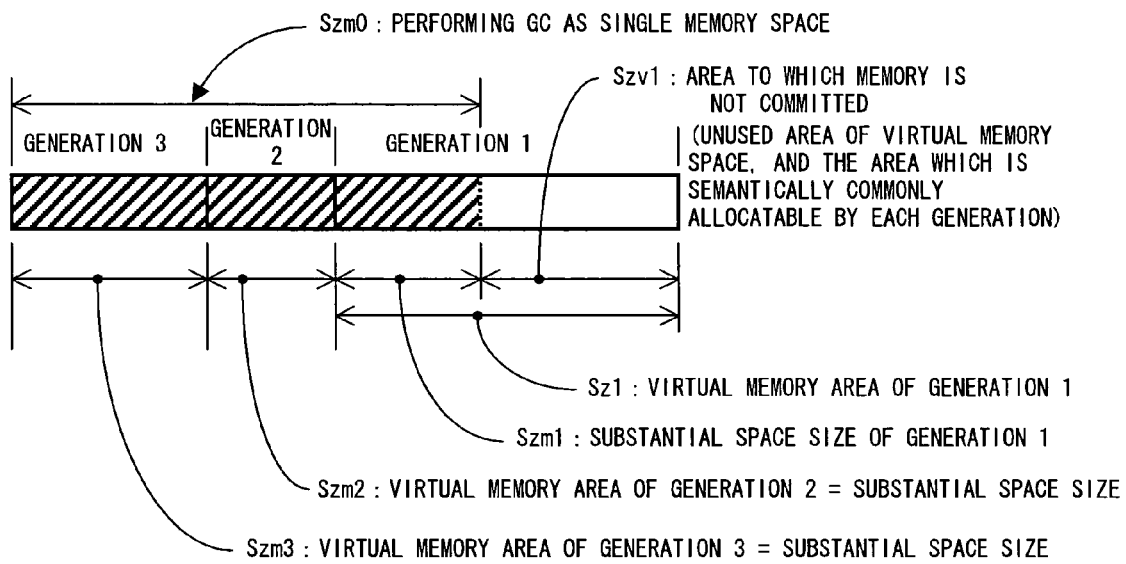
FIG. 14 is an explanatory view of the execution mode of the full GC process of S2*b*.

FIG. 14 is an explanatory view of the execution mode of the full GC process of S2b.

As shown in FIG. 14, for example, assuming that the number of generations is 3, the GC process can be performed based on the same GC specification and a single memory space comprising the generation spaces of the generations 1, 2, and 3.

In FIG. 14, Szm0 is the size of a single memory size comprising the generation spaces of the generations 1, 2, and 3. Szm1, Szm2, and Szm3 are the sizes (virtual memory area) of the generation spaces (substantial space) of the generations 1, 2, and 3. Sz1 is the size of the virtual memory space (virtual memory area) of the generation 1. Szv1 is a space to which memory is not committed in the virtual memory space of the generation 1, that is, an unused area in a single virtual memory space allocated to the entire generations, and is semantically commonly allocatable by each generation.

However, in the full GC process of S2b, it is necessary to make all objects used in an application contiguous in address by assuming that the adjusted area depending on the implementation among the generation spaces are dead objects to process each generation space as a single memory space. Otherwise, in the full GC process of S2b, the memory space cannot be traversed to detect alive objects. An adjusted area depending on the implementation refers to a memory area not used by an application, that is, an area containing no object, and it is referred to in the present specifications as "gap".

Figure 15:
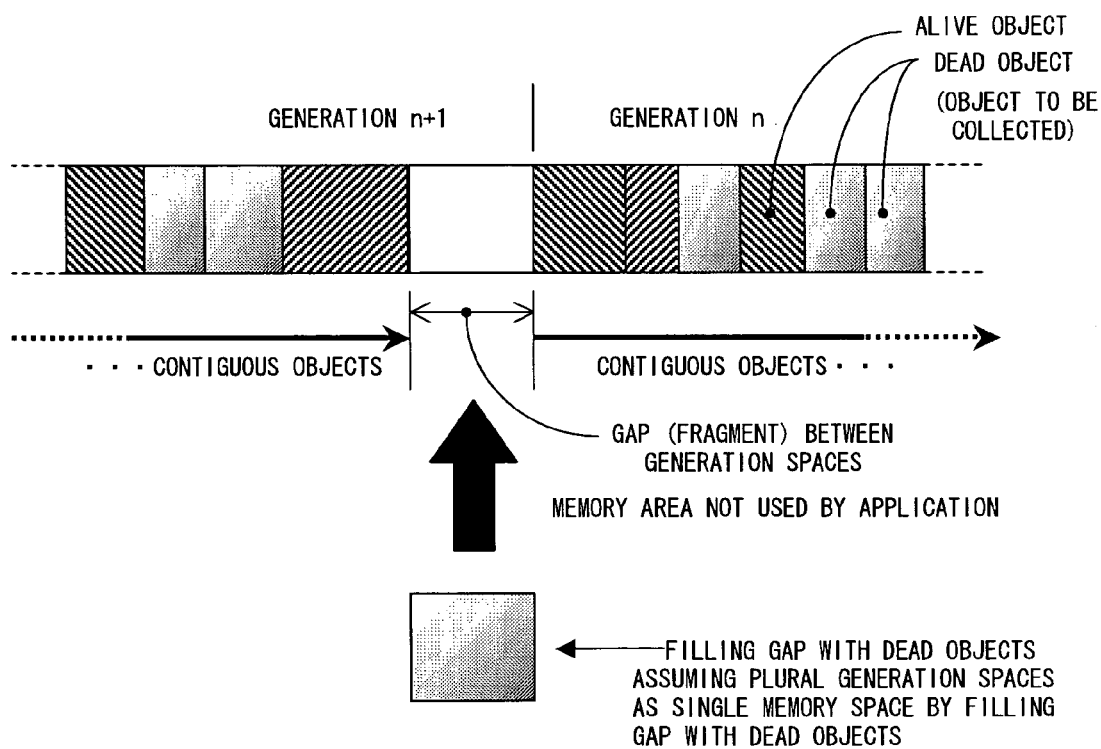
FIG. 15 is an imaginary view obtained when a gap between the generation spaces is filled with dead objects.

FIG. 15 is an imaginary view obtained when a gap between the generation spaces is filled with dead objects.

As shown in FIG. 15, by filling the fragment as a gap between the generation spaces with dead objects, each generation space can be processed as a single memory space, and it is possible to traverse each generation space to detect an alive object in the full GC process of S2b. An dead object for filling the gap between the generation spaces can be, for example, an int array, etc.

Figure 16:
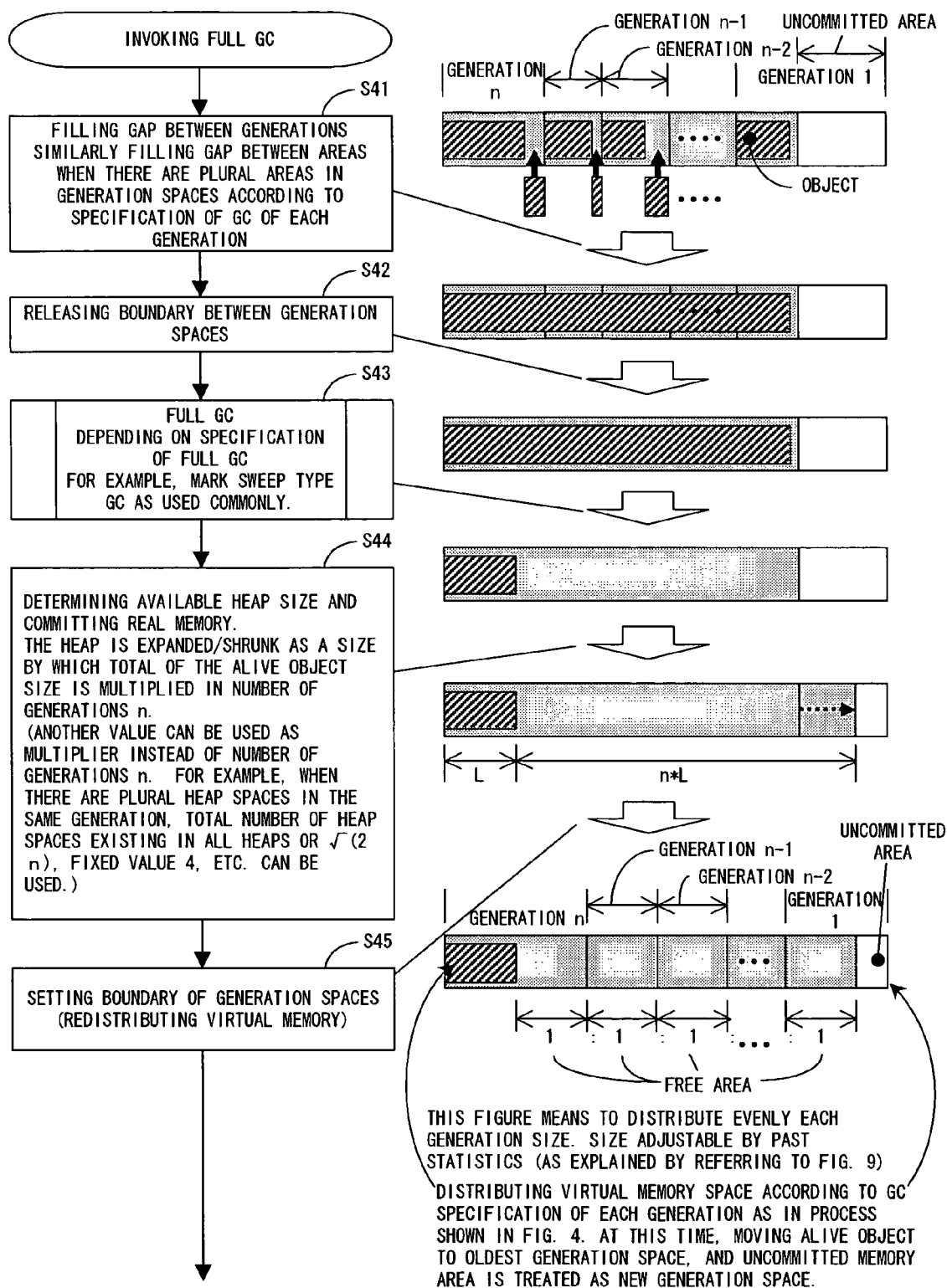
FIG. 16 is a flowchart of the full GC process of S2*b* and an imaginary view of the virtual memory space during the process.

FIG. 16 is a flowchart of the full GC process of S2a shown in FIG. 1 and an imaginary view of the virtual memory space during the process.

As shown in FIG. 16, the full GC is invoked at a request from an application or in S33 shown in FIG. 11, the gap between generation spaces is filled with dead objects as described above (S41). Relating to the specification of the GC of each generation, when there are a plurality of areas in a generation space, the gap between the areas is similarly filled.

Then, the boundary between the generation spaces is released (S42), and the full GC process is performed (S43). In S43, depending on the specification of the same GC, for example, a commonly used mark sweep type GC is used.

Then, the size of an available heap space is determined, and memory is committed or a part of memory is uncommitted (a part of memory is released from a virtual memory space) (S44) Practically, the size of the available heap space is allocated by multiplying the total size L of an alive object by the number of generations (total number of generations) of n, thereby expanding or shrinking the heap space. The number of generations of n can be replaced with another value as a multiplier. For example, when there are a plurality of heap spaces in the same generation, the total number of heap spaces in all heap spaces can be used, or simply ((2n) or a fixed value of 4 can be used.

Then, the boundary between generation spaces is set, that is, a virtual memory space is redistributed (S45). Practically, as with the allocation of a virtual memory space performed on the generational GC environment preparing and initializing process in S1 shown in FIG. 1, a virtual memory space is redistributed based on the GC specification of each generation. At this time, an alive object is moved to the oldest generation space, and an area to which memory has not been committed yet (uncommitted area) is processed as the newest generation space. With this redistribution, for example, the heap size n×L determined in S44 can be evenly distributed, or the size can be adjusted between generation spaces and redistributed according to the past statistics as explained by referring to the GC process of the target generation shown in FIG. 9.

In the present embodiment, the garbage collector process shown in FIG. 1 can be performed by a general-purpose computer. To realize this, the above-mentioned generational GC program used to direct a computer to perform the garbage collector process is stored in advance in a computer-readable recording medium (storage medium), the generational GC program is read from the recording medium and temporarily stored in the main memory of the computer, and then the stored program is read by the central processing unit of the computer to execute the program.

FIG. 17 shows an example of a computer-readable storage medium storing the above-mentioned generational GC program. The recording medium can be, for example, any of memory 2 such as a semiconductor memory, a hard disk device, etc. built in or externally attached to the computer 1, a portable storage medium 3 such as CD-ROM, DVD-ROM, MO (magneto optical disk), a floppy disk, etc., and a storage device 6 of a program server connected to the computer 1 through a line 4 and capable of downloading a program by the computer 1.

The present invention is explained above in detail, but the present invention is not limited to the above-mentioned embodiments, but various improvements and variations can be made with the scope of the gist of the present invention.

As described above, according to the present invention, the virtual memory space size of each generation can be dynamically adjusted in the generational GC implemented in the computer system. Therefore, when there are only a small number of long-lived objects, the virtual memory spaces of new generations are made larger. When there are a larger number of long-lived objects, the virtual memory spaces of old generations can be dynamically and continuously made larger. Accordingly, unused virtual memory spaces do not increase by the imbalance of the memory use frequency of each generation as in the conventional cases, and the size of the virtual memory space of each generation can be flexibly adjusted. Therefore, in the computer system which implements the generational GC, finite virtual memory spaces can be efficiently used.

What is claimed is:

1. A computer-readable storage medium storing a generational garbage collection program used to direct a computer to perform a generational garbage collection process, the generational garbage collection process comprising:
   a generational garbage collection environment preparing and initializing process; and
   a full garbage collection process, wherein
   the generational garbage collection environment preparing and initializing process comprises:
   a process of allocating a single virtual memory space as a virtual memory space of all generations, and distributing the single virtual memory space to each generation such that the virtual memory space of each generation can be continuously arranged in order of generation in the single virtual memory space; and
   a process of committing memory to the single virtual memory space such that, when there are contiguous spaces to which memory is committed, and there is a space to which the memory is not committed in the single virtual memory space, the space to which the memory is not committed can be provided in a newest generation,
   the full garbage collection process comprises:
   filling a space with dead objects when there is the space where no object exists between generations in a space to which memory is committed in the single virtual memory space;
   releasing a boundary between generations in the single virtual memory space;
   performing a garbage collection process in a space to which memory is committed in the single virtual memory space; and
   redistributing the single virtual memory space to each generation such that a virtual memory space of each generation can be contiguously arranged in order of generation in the single virtual memory space.

2. The storage medium according to claim 1, wherein:
   the generational garbage collection process further comprises a target generation garbage collection process; and the target generation garbage collection process comprises a process of changing distribution of a virtual memory space between a target generation and a generation older by one generation than the target generation which is a movement destination generation of an alive object after collecting dead object and movement of all alive objects by promotion are completed in a virtual memory space of a target generation.

3. The storage medium according to claim 2, wherein the target generation garbage collection process further comprises a process of stopping movement of an alive object after a failure and restoring reference to an object which moves before the failure when movement of an alive object by promotion fails in the target generation garbage collection process.

4. The storage medium according to claim 1, wherein:
   in the redistributing, an alive object exists in a virtual memory space of an oldest generation, and a space to which memory is not committed in the single virtual memory space is provided in a virtual memory space of a newest generation.

5. The storage medium according to claim 1, wherein:
   the generational garbage collection process further comprises a target generation garbage collection process; and
   the target generation garbage collection process comprises a process of changing distribution of a virtual memory space between a target generation and a generation older by one generation than the target generation which is a movement destination generation of an alive object after collecting dead object and movement of all alive objects by promotion are completed in a virtual memory space of a target generation.

6. The storage medium according to claim 5, wherein the target generation garbage collection process further comprises a process of stopping movement of an alive object after a failure and restoring reference to an object which moves before the failure when movement of an alive object by promotion fails in the target generation garbage collection process.

7. A generational garbage collection method for performing a generational garbage collection process, the generational garbage collection process comprising:
   a generational garbage collection environment preparing and initializing process; and
   a full garbage collection process, wherein
   the generational garbage collection environment preparing and initializing process comprises:
   a process of allocating a single virtual memory space as a virtual memory space of all generations, and distributing the single virtual memory space to each generation such that the virtual memory space of each generation can be continuously arranged in order of generation in the single virtual memory space; and
   a process of committing memory to the single virtual memory space such that, when there are contiguous spaces to which memory is committed, and there is a space to which the memory is not committed in the single virtual memory space, the space to which the memory is not committed can be provided in a newest generation,
   the full garbage collection process comprises:
   filling a space with dead objects when there is the space where no object exists between generations in a space to which memory is committed in the single virtual memory space;
   releasing a boundary between generations in the single virtual memory space;
   performing a garbage collection process in a space to which memory is committed in the single virtual memory space; and
   redistributing the single virtual memory space to each generation such that a virtual memory space of each generation can be contiguously arranged in order of generation in the single virtual memory space.

8. The method according to claim 7, wherein:
   the generational garbage collection process further comprises a target generation garbage collection process; and
   the target generation garbage collection process comprises a process of changing distribution of a virtual memory space between a target generation and a generation older by one generation than the target generation which is a movement destination generation of an alive object after collecting dead object and movement of all alive objects by promotion are completed in a virtual memory space of a target generation.

9. The method according to claim 7, wherein:
the generational garbage collection process further comprises a target generation garbage collection process; and
the target generation garbage collection process comprises a process of stopping movement of an alive object after a failure and restoring reference to an object which moves before the failure when movement of an alive object by promotion fails in the target generation garbage collection process.

10. A generational garbage collection apparatus comprising:
a CPU for performing a generational garbage collection process by executing a generational garbage collection program stored in a computer-readable storage medium to generate a generational garbage collection unit, wherein
the generational garbage collection unit comprises:
a generational garbage collection environment preparing and initializing unit; and
a full garbage collection unit, wherein
the generational garbage collection environment preparing and initializing unit comprises:
an allocating unit to allocate a single virtual memory space as a virtual memory space of all generations;
a distributing unit to distribute the single virtual memory space to each generation such that the virtual memory space of each generation can be continuously arranged in order of generation in the single virtual memory space; and
a committing unit to commit memory to the single virtual memory space such that, when there are contiguous spaces to which memory is committed, and there is a space to which the memory is not committed in the single virtual memory space, the space to which the memory is not committed can be provided in a newest generation,
the full garbage collection unit comprises:
a filling unit to fill a space with dead objects when there is the space where no object exists between generations in a space to which memory is committed in the single virtual memory space;
a releasing unit to release a boundary between generations in the single virtual memory space;
a performing unit to perform a garbage collection process in a space to which memory is committed in the single virtual memory space; and
a redistributing unit to redistribute the single virtual memory space to each generation such that a virtual memory space of each generation can be contiguously arranged in order of generation in the single virtual memory space.

* * * * *